United States Patent
Fujita

[19]

[11] Patent Number: 5,875,758
[45] Date of Patent: Mar. 2, 1999

[54] RESIN AIR INTAKE SYSTEM PROVIDED WITH INTAKE CONTROL VALVE

[75] Inventor: Susumu Fujita, Yokohama, Japan

[73] Assignee: E. I. du Pont de Nemours and Company, Wilmington, Del.

[21] Appl. No.: 930,227

[22] PCT Filed: Apr. 4, 1996

[86] PCT No.: PCT/US96/04615
    § 371 Date: Oct. 1, 1997
    § 102(e) Date: Oct. 1, 1997

[87] PCT Pub. No.: WO96/31692
    PCT Pub. Date: Oct. 10, 1996

[30]     Foreign Application Priority Data

Apr. 6, 1995  [JP]  Japan ........................... 7-81277

[51] Int. Cl.⁶ .............................. F02M 35/10; F02D 9/10
[52] U.S. Cl. .................... 123/336; 123/184.61; 123/337; 251/148; 251/367
[58] Field of Search ..................... 123/336, 337, 123/184.61; 251/148, 367

[56]               References Cited

U.S. PATENT DOCUMENTS 4,523,560  6/1985  Motosugi et al. ................. 123/308
4,768,487  9/1988  Yamamoto et al. ................. 123/470
4,907,547  3/1990  Daly ........................ 123/184.61 X

FOREIGN PATENT DOCUMENTS 2 606 115   5/1988  France .
43 29 522   3/1995  Germany .

Primary Examiner—Tony M. Argenbright

[57]                ABSTRACT

A resin air intake system provided with an intake control valve which permits simplifying the mold structure and maintaining axis center precision. In an air intake manifold, air intake passages are fabricated to be opened and provided with an intake control valve supported by a shaft having an axis in a direction perpendicular to the axes of the openings. The air intake manifold is molded from a resin as an air intake manifold proper and an air intake manifold cluster which have split faces, the split face of the air intake manifold proper provided with grooves in a direction perpendicular to the axes of the openings. Bearings which slidably support the shaft are mounted in the grooves and a projection which projects from the split face of the air intake manifold cluster is brought into contact with the bearings.

4 Claims, 6 Drawing Sheets

RESIN AIR INTAKE SYSTEM PROVIDED WITH INTAKE CONTROL VALVE

BACKGROUND OF THE INVENTION

1. Field of the Invention

The present invention relates to an engine air intake system, particularly a resin air intake system provided with an intake control valve, designed to make the air intake system be provided with an air intake control valve of a resin.

2. Description of Related Art

Requirements for higher performance engines in recent years have resulted in using a variety of systems for air intake systems. There is known a so-called variable air intake system to improve both the engine torque in the medium to low speed range and to improve output in the high speed region. These try to increase the engine fueling efficiency by varying the essential air intake type lengths or capacity of the air intake system according to the engine operating conditions, so as to make effective use of inertial and resonance actions under a given situation.

In order to change the air intake tube length or capacity, such a variable air intake system equips the air intake constituting part, such as an air intake manifold, with air intake passages open to be connected to each combustion chamber of an engine with intake control valves rotatably, which are supported by a shaft having an axis in the direction perpendicular to the axes of the openings. Driving this shaft with an external actuator is designed to control the opening and closing of the intake control valve.

There is known a lean combustion engine for improved engine fuel consumption rate for energy saving, in which its air intake manifold is provided with a plurality of air intake passages per cylinder, and controlling the opening and closing of an intake control valve provided for one of the air intake passages is designed to give an air intake with a swirl within the designated operating range.

In general, such an air intake manifold is cast from a metal such as aluminum and bearing holes to support the above shaft rotatably are drilled by machining after casting. A split butterfly valve for a manifold is disclosed in FR-A-2606115. Two halves of the manifold can be molded from a metal or an appropriate plastic. The butterfly is positioned on a shaft and secured in the split housing. The securing and positioning means are complicated in that recesses are cut into positioning flanges on both halves.

SUMMARY OF THE INVENTION

From the standpoint of energy saving, requests for reducing engine weight are still intense, for which attempts and proposals have been made to make an engine air intake system from a resin. Among these approaches, there are examples in which part of an air intake system, such as a simple design air duct and an intake manifold with no movable parts have already been made of a resin, but there is yet no example in which a resin is used to make an air intake system provided with the above intake control valve, particularly in an air intake manifold.

Having no such example may be rationalized in terms of the insufficient development of materials which can possess the heat resistance in a high temperature engine compartment and have strength enough to endure the shaking resulting from engine vibration.

Furthermore, another lack of such example may be due to the fact that an air intake manifold provided with an intake control valve, or the like, is too complicated in configuration to allow an ease of fabricating the molds or cores therefore. In particular, if an intake control valve, and the like, are provided, there is a need for having a bearing opening which rotatably supports the shaft for the intake control valve, but drilling such an opening by machining after molding from a resin will not allow taking advantage of molding by a one-shot molding operation, while fabricating it by molding alone will aggravate the difficulty in making such a mold for it.

In addition, when a plurality of intake passages are arrayed in parallel, machining such a bearing hole opening incurs extreme difficulty in achieving a precision axis center in the case of the resin. Therefore, the problem has been that since the machining of the bearing opening is difficult, supporting the shaft while warranting the sealability of each air intake passage is also difficult.

It is an objective of this invention to solve the previous problems and to provide a resin air intake system provided with an intake control valve which permits simplifying the mold structure and maintaining the axis center precision.

It is another objective of this invention to provide a resin air intake system provided with an intake control valve which can easily assure the sealability of each air intake passage or the sealability of the shaft support.

DETAILED DESCRIPTION

Figure 1:
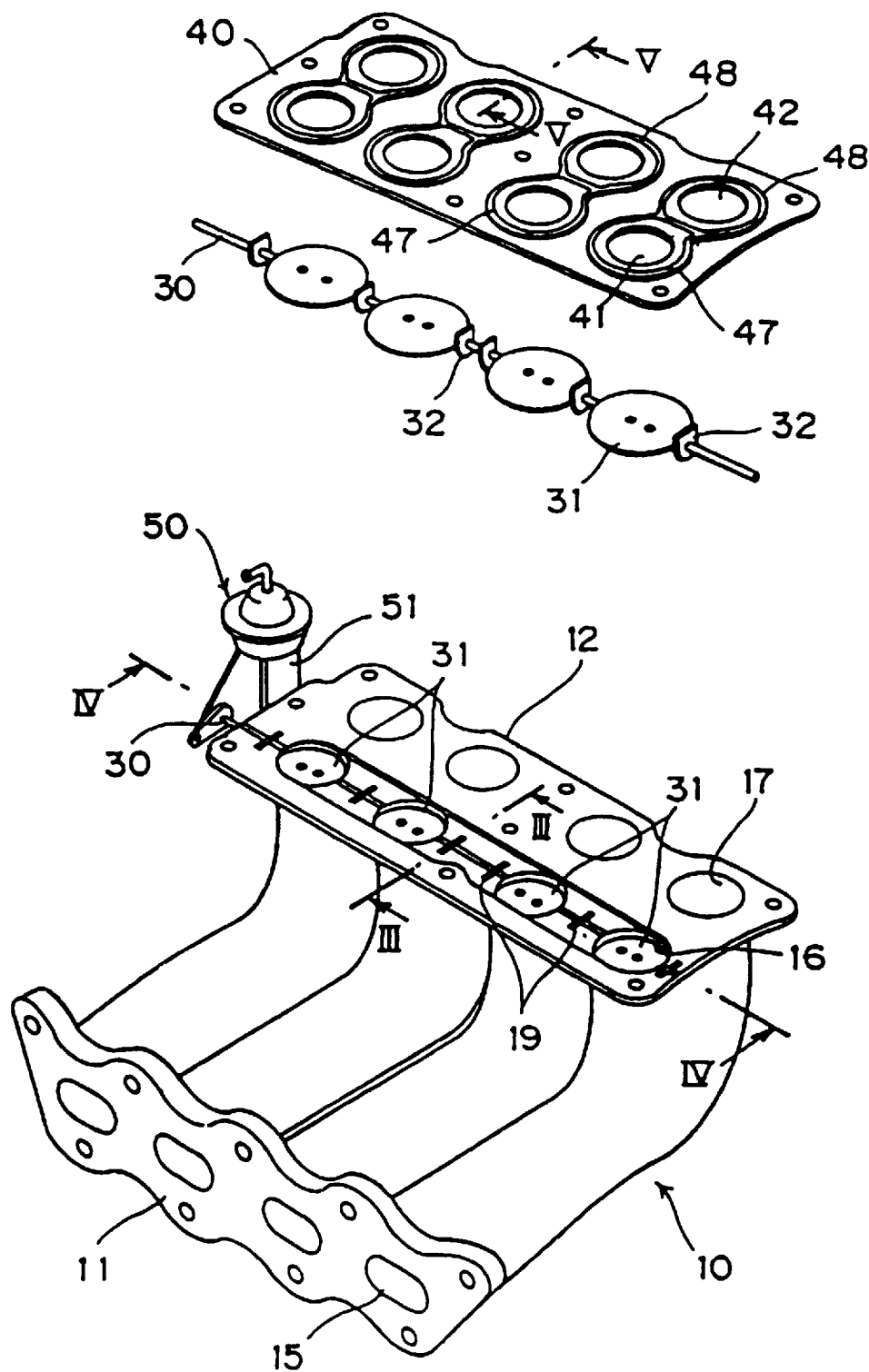
FIG. 1 is an exploded oblique view showing Example 1.
Figure 2:
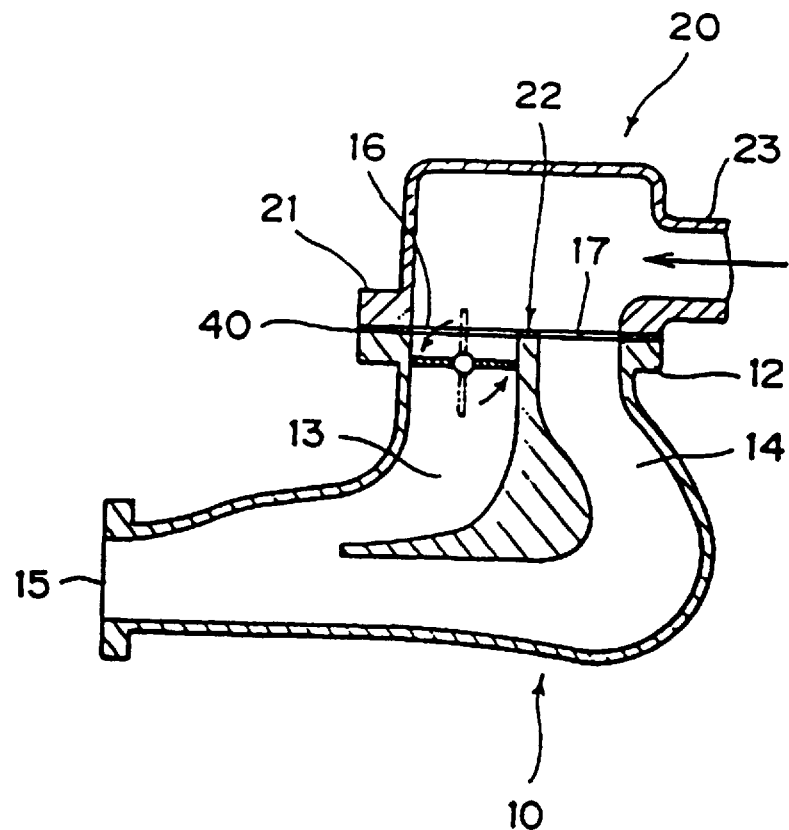
FIG. 2 is a cross sectional view showing the way Example 1 is assembled.

In order to achieve such objectives, one embodiment of this invention comprises is a resin air intake system provided with an intake control valve characterized in that in an air intake system comprising an air intake constituting part with an air intake passage open to be connected through an engine combustion chamber which part is provided with intake control valves supported by a shaft having an axis in the direction perpendicular to the axes of the openings, wherein said intake constituting part is molded from at least a first and second part having a split face between the two; providing said split face of said first part with a groove in the direction perpendicular to the axes of said openings; fitting into said groove a bearing part which slidably supports said shaft; and bringing a projection which projects from said split face of the second part into said bearing part.

A preferred embodiment of this invention is that the above groove has a U-shaped cross section and is provided with notched grooves in which the side edge of said bearings are engaged.

A further preferred embodiment of this invention comprises a resin air intake system provided with an intake control valve wherein said first and second parts make up an intake manifold provided with a plurality of air intake passages built in parallel; said shaft is one common shaft which supports the intake control valves corresponding to the plurality of air intake passages; and said bearing parts are mounted with at least one on each side of each air intake passage.

Another preferred embodiment of this invention is characterized in that a resin air intake system is provided with an intake control valve in which said first and second parts make up a throttle body and said intake control valve is a throttle valve.

Another embodiment of this invention comprises a resin air intake system provided with an intake control valve characterized in that an air intake system comprises an air intake constituting part with an air intake passage open to be connected through an engine combustion chamber which part is provided with an intake control valve supported by a shaft having an axis in the direction perpendicular to the axes of the openings, wherein said intake constituting part is molded from at least a first, second, and third part having a split face between the two; providing said split face of said first part with grooves in the direction perpendicular to the axes of said openings; fitting into said grooves bearing parts which slidably support said shaft; and bringing a projection which projects from a front side split face of said third part into said bearings at the same time bringing the back side split face into the split face of said second part.

A preferred embodiment of this invention is characterized by a resin air intake system provided with an intake control valve except the third part is a plate having a gasket for sealing in the form of covering said air intake passage for each of the said front side and back side split face.

Operation

According to one embodiment of this invention, the air intake constituting part with its air passage through an engine compartment being formed open is molded from at least a first and a second resin part which has a split face between the two and the split face of the first part is provided with a groove in the direction perpendicular to the axes of the openings. A bearing which slidably supports a shaft provided with an intake control valve is made to fit into the groove and the projection which projects from the split face of the second part is brought into contact with the bearing. The shaft is held within the groove provided on the split face of the first part, so that the mold structure is simplified and axis center precision can also be maintained. Since the bearing parts are made to fit in the groove and the projection is brought into contact with the bearings, this readily assures the sealability of the shaft support.

According to a preferred embodiment of this invention, said groove has a U-shaped cross section and is provided with notched grooves within which the side edge of said bearings fit, so that there is no revolution of the bearing due to the revolution of the shaft or shifting in the thrust direction to give further better sealability.

According to further improved embodiment, said first and second parts make up an air intake manifold provided with a plurality of air intake passages fabricated in parallel and the shaft is a one common shaft that supports the air intake control valves corresponding to the plurality of air passages and at least one of said bearing is mounted on each side of each air intake passage; hence, the mold structure as described above can be simplified and its axis center precision can also be maintained. Furthermore, the sealability of the shaft support, that is, the sealability between each air intake passage can also be readily assured.

According to another preferred embodiment of this invention in which the above first and second parts make up a throttle body and said air intake control valve is a throttle valve, there is no need to mold the groove body independently, thereby simplifying the mold structure.

According to another embodiment of this invention, the air intake constituting part with its air intake passage through an engine compartment chamber is fabricated open and is molded from at least a first, second, and third part having a split face therebetween and the split face of the first part is provided with a groove in a direction perpendicular to the axes of the openings. A bearing which supports slidably a shaft provided with an air intake control valve is made to fit into the above groove; the projection which projects from the front side split face of the third part is brought into contact with the bearing, at the same time bringing the backside split face into contact with the split face of the second part. Thus, the shaft can be held in the groove provided on the split face of the first part, so that the mold structure can be simplified and the bearing center precision can also be maintained. Furthermore, since the bearing is made to fit into the groove and the projection which projects from the front side split face of the third part is brought into contact with the bearing so that the sealability of the shaft support can also be readily assured.

Furthermore, according to a preferred embodiment, the third part is a plate provided with a gasket for sealing in the form of surrounding the air intake passage for each of the front side split face and back side split face so that the sealability between each air intake passage can also be assured, in addition, making it easy to fabricate the third part. The mold structure can also be further simplified.

EXAMPLES

Preferred examples of this invention are described specifically based on the examples described by the attached drawings. Each of these examples are meant to illustrate the invention without limiting the scope thereof. In fact, it would be clear to those skilled in the art that a variety of amendments and modifications of this invention can be made without deviating from the scope, that is, the spirit of this invention. For example, any features which are illustrated or described as a part of Example 1 can be other examples to create further examples. Throughout the described explanations and drawings, identical functional sites use comparable numerals.

Example 1 of this invention is described by referring to FIGS. 1–6.

Example 1

An application of this invention to a variable air intake system which makes use of an air intake inertia action.

In the figure, 10 is an air intake manifold proper; 20 is an air intake manifold cluster, each as a whole is fabricated from a glass fiber reinforced thermoplastic resin. The thermoplastic resin used here in terms of heat resistance and strength-wise adaptability is preferably polyamide, polyester, or polyphthalamide, or the like. Air intake manifold proper 10 is provided at both ends thereof first and second attaching flanges 11 and 12. Furthermore, in this example, for each cylinder of the engine (not illustrated) a short length air intake passage 13 and a long length second air intake passage 14 are provided. These first and second air intake passages are confluenced mid-way and they open as a common opening 15 in the first attaching flange 11. In the second attaching flange 12, each opens as a first and second opening 16 and 17. For this example, which is an air intake manifold for a four cylinder engine, such first and second openings 16 and 17 are paired and arrayed as four pairs in parallel. The first and second air passages 13 and 14 can be molded using a core by a "lost core" process.

In the molding operation, the edge face of the second flange 12, that is, the split face, is provided with a U-shaped cross sectional groove 18 in the direction perpendicular to the axes of the first openings 16. Groove 18, so as to permit the shaft to be described later, to extend outwardly has one end opened to the outside of the second flange 12. Groove 18 is provided with at least one notched slot 19 on each side of each of the four first openings 16. In the illustrated example, the length between the opening 16 and 16 corresponding to the second or third cylinder is too long so that the two notched slots 19 and 19 are provided. Notched slots 19 have a broader designated width and deeper U-shaped grooves relative to the U-shaped cross sectional groove 18 and they have the designated thickness.

The air intake manifold cluster is provided with a flange 21 in a shape corresponding to the second flange 12 of the air intake manifold proper, 10, and the flange 21 is provided with openings 22 in a form which encompasses the first and second openings 16 and 17, arrayed as four pairs as described above.

The air intake manifold cluster 20 is connected through its integrated duct 23 to an upstream throttle body (not illustrated). Here, the above air intake manifold 10 makes up the first part of the air intake constituting part and the air intake manifold cluster 20 constitutes the second part of the air intake constituting part and the edge faces of the flanges 12 and 21 are split faces.

30 is a shaft having an axis in the direction perpendicular to the axes of the openings 16, which in this example is a common single metal shaft. A common single shaft may be made by connecting a multiple number of metal shafts obtained by machining the engaging sections in a preliminary step. The designated bearing chamfer of said shaft 30, as is well known, supports butterfly type air intake control valves 31 corresponding to the number of openings 16 so as to be pivoted. Instead of this attachment, a resin valve may be molded onto the shaft. Shaft 30 is provided with bearings 32 which slidably support shaft 30 at a position corresponding to the above notched grooves 19. Bearings 32 engage with the notched slots 19 and are wide and thick enough to constitute a contact seal or a labyrinth seal; and their upper ends are made into a flat U-shape. These are made of a resin or metal which has excellent sliding properties, preferably a polyamide or polyimide if a resin is used or a bearing metal if a metal is used.

40 is a carrier plate as a third part and is made of a resin similar to that of the first and second parts. The carrier plate 40 has a contour corresponding to each of the flanges 12 and 21 of the above air intake manifold proper 10 and air intake manifold cluster 20, respectively, and is interposed between the two flanges. Openings 41 and 42 are provided corresponding to the above openings 16 and 17 of the first and second parts. The front side of carrier plate 40 (the side opposite to that illustrated in FIG. (1)) has the projections 43 projecting from the split face (see FIGS. 3 and 4) with the projections having a shape which is brought into contact with the upper end of bearing 32 corresponding to the width and thickness of the above notched slot 19. The front and back sides of the carrier plate 40 are provided with annular grooves 44 and 45 in the shape of surrounding openings 41 and 42 corresponding to the openings 16 and 17 of the above first and second parts. However, the annular groove 44 on the front side surrounding opening 41 is an exception made discontinuous by projection 43 (see FIG. 3). The annular grooves 44 and 45 on the front side are connected to the annular grooves 44 and 45 on the back side through their bases via a continuous opening 46 provided at certain intervals. The annular grooves 44 and 45 on the front and back sides are provided with rubber and like gaskets 47 and 48 by casting so as to project from the front and the back sides in the state of non-compressed condition. Incidentally, the front and back side gaskets 47 and 48 are connected via the above connecting opening 46 and are prevented from dropping off from carrier plate 40 after casting.

50 is an actuator supported by support bracket 51, integrally molded to the air intake manifold proper 10, which drives the revolving shaft 30. Support bracket 51 may be formed separately. The actuator is a pressure response type diaphragm actuator or an electrical motor.

In the above example, the air intake manifold proper 10, air intake manifold cluster 20, and carrier plate 40 are molded from the resin in the above configuration and then assembled with a sub-assembled air intake control value 31. That is, the shaft 30 is placed in the groove 18 while the bearings 32 which support slidably the shaft 30 are engaged in the notched slot 19; and the carrier plate 40 is mounted on the flange 12. The flange 21 of the air intake manifold cluster 20 is mounted on the carrier plate 40 and the flanges 12 and 21 are fastened by bolts (non-illustrated) with the carrier plate 40 interposed therebetween. As tightening progresses, the gaskets 47 and 48 of carrier plate 40 are compressed and deformed so as to bring the split faces to come in contact with each other. In this case, projection 43 which projects from the front side split face of the carrier plate 40 is engaged in the top of notch slot 19, coming in contact with the top flat face of the bearings 32, thereby aligning to secure the bearings 32 at the designated positions. A dimensional relationship is established between the bearings 32 and notched grooves 19 so as not to cause shaft 30 to substantially come in contact with slot 18, which is preferred for the maintenance of the shaft 30 at the center and prevention of wear. Lastly, the actuator 50 is connected to shaft 30.

In the variable air intake system in this example, as the shaft 30 rotates, sliding against bearings 32 when driven by the actuator 50 in the low to medium revolution range of an engine, and the control valves 31 supported by shaft 30 close the first air intake passages 13 to introduce air intake to the engine only through the lengthy second air intake passages. When a high speed revolution range is reached, the short length first air intake passages 13 are opened by the air intake control valves 31 to allow air intake through both the first and second air intake passages 13 and 14. Thus, it is essential that the air passage length can be switched according to the engine revolution region to a length suitable for obtaining a inertial-supercharging effect, thus enhancing the charge efficiency.

Any leakage among the first air intake passages 13 corresponding to each cylinder when the air intake control valves are in a closed position, is prevented by having the U-shaped bearings 32 engaging with the notched slot 19 with their upper ends being brought into contact with the projection 43 of the carrier plate 40, as well as by the gasket 47 between the split faces.

Figure 7:
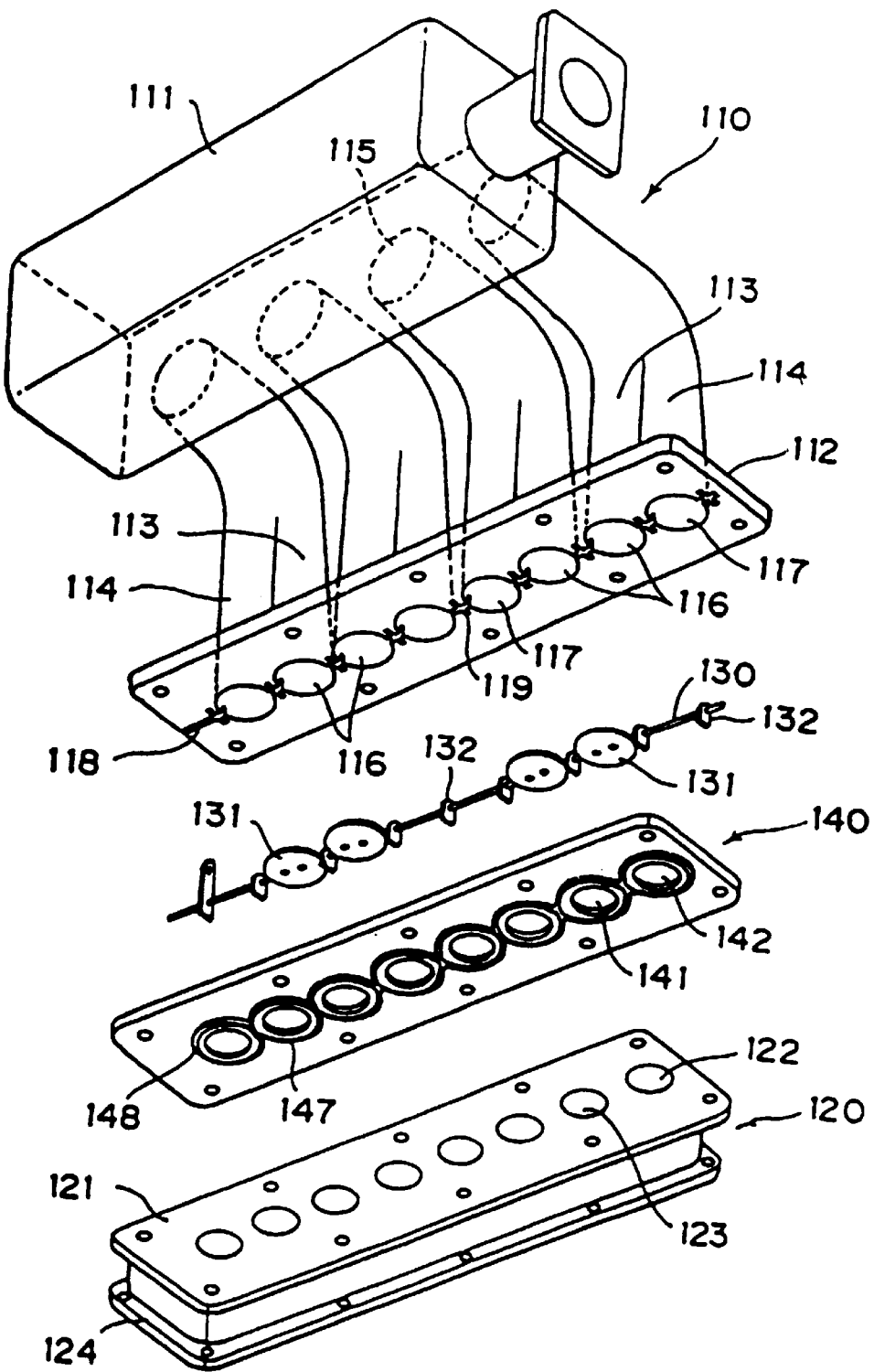
FIG. 7 is an exploded oblique view showing Example 2 of this invention with a different point of viewing for the supplementary air intake manifold 120 to aid comprehension.

A similar example of this invention is explained referring to FIG. 7. This example is an application of this invention to the air intake system of a lean combustion engine.

In the figure, 110 is an air intake manifold proper and 120 is a supplemental air intake manifold. Both, as entireties, are molded, as in the case of the above example, of a glass fiber reinforced thermoplastic resin. In this example, the upstream section of the air intake manifold proper 110 is integrally molded as a cluster section with a surge tank 111, with the bottom ends provided with attaching flange 112. Each cylinder of the engine (not illustrated) is provided with about equal lengths of first air intake passage 113 and second air intake passage 114. These first and second air intake passages come to confluence midway and open to surge tank 111 at a common opening 115. Attaching flange 112 is opened by way of openings 116 and 117 for the first and second parts. Since this example is for an air intake manifold for a four cylinder engine four pairs of such first and second openings 116 and 117 are arrayed in a series.

The edge face of the attaching flange 112, that is the split face is provided with a U-cross-sectional shaped groove 118 which runs in a direction perpendicular to the axes of openings 116. The groove 118 has one end opened to the outside of attaching flange 112. Groove 118 is provided with at least one notched slot 119 for each side of the eight first and second openings 116 and 117. Notched slot 119, as in the above example, has a designated broader width and deeper U-shaped cross-section compared to the U-cross-sectional shaped groove 118 and has a designated thickness.

In the supplementary air intake manifold 120, at the upper end an attaching flange 121 is provided in a shape corresponding to the attaching flange 112 of the air intake manifold proper 110; said flange 121 is provided with the first and second openings 122 and 123 in a shape corresponding to the openings 116 and 117 of the four paired first and second parts, as well as the first and second supplementary air intake passages (not illustrated) connected to the openings 122 and 123. At the bottom is provided an attaching flange 124 corresponding to a similar engine cylinder head, and so on.

In this example, the aforementioned air intake manifold proper 110 makes up the first part of the air intake constituting part and the supplementary air intake manifold 120 makes up the second part of the air intake constituting part with their flanges 112 and 121 edges faces becoming split faces.

130 is a shaft having an axis in the direction perpendicular to those of openings 116 and is a common single metal shaft in this example. The designated bearing chamfer of the shaft 130 as is well known, supports butterfly inlet control valves 131 in a number corresponding to the numbers and positions of the first openings 116. Shaft 130 is provided with bearing 132 which slidably supports shaft 130 at a position corresponding to the above notched slot 119. A bearing 132, as in the previous example, has enough width, thickness, and material so as to be engaged with notched slot 119 to make up a labyrinth seal U-shaped with a flat top end.

140 is a carrier plate as a third part and is molded from a resin similar to that of the first and second parts. Carrier plate 140 has a contour corresponding to each of the flanges 112 and 121 of the above are intake manifold proper 110 and supplementary air intake 120 and is interposed between these two flanges. It has openings 141 and 142 corresponding to the openings 116 and 117 of the first and second parts.

The basic structure with a carrier at 140 is identical to the carrier plate 40 of the previous example except for different opening positions, and the like parts are explained using symbols with the symbols increased by 100 with respect to the symbols used in illustrating FIGS. 3–6; FIGS. 3–6 should be referred to in following the description below.

Figure 3:
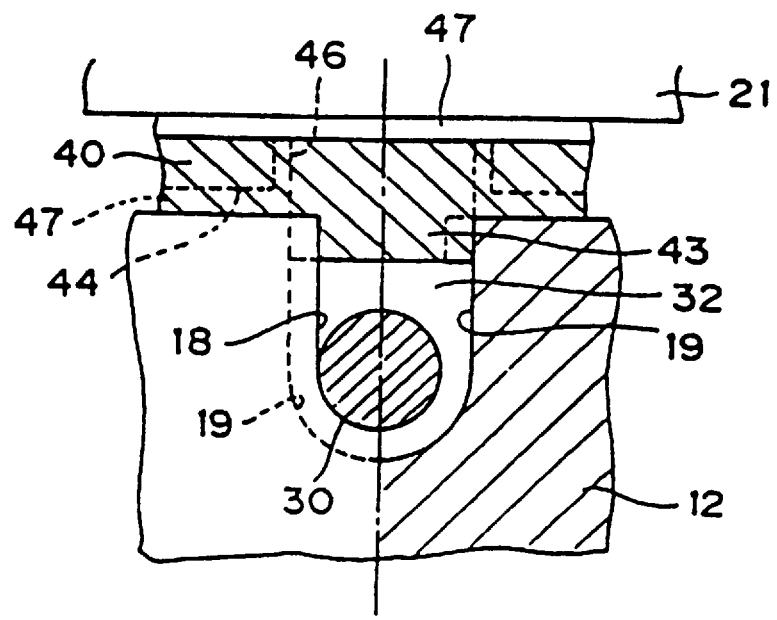
FIG. 3 is a semi-cross sectional view along III—III line cut of FIG. 1.
Figure 4:
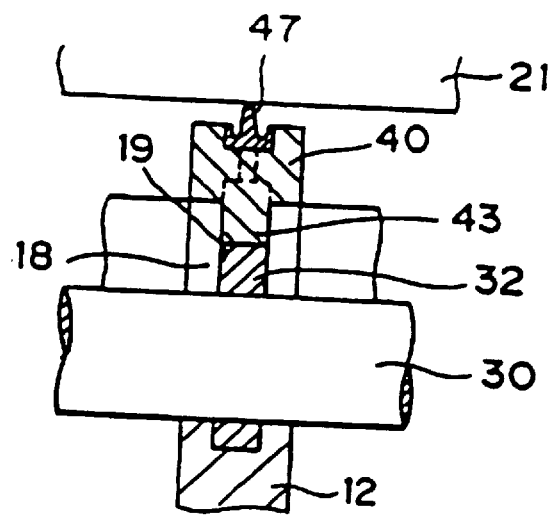
FIG. 4 is a partial cross sectional view along IV—IV line of FIG. 1.
Figure 5:
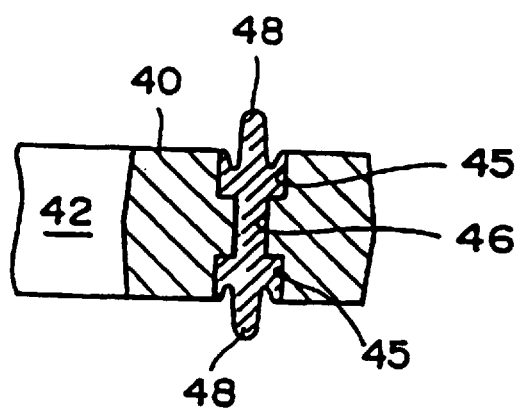
FIG. 5 is a partial cross sectional view of a carrier plate along V—V line of FIG. 1.
Figure 6:
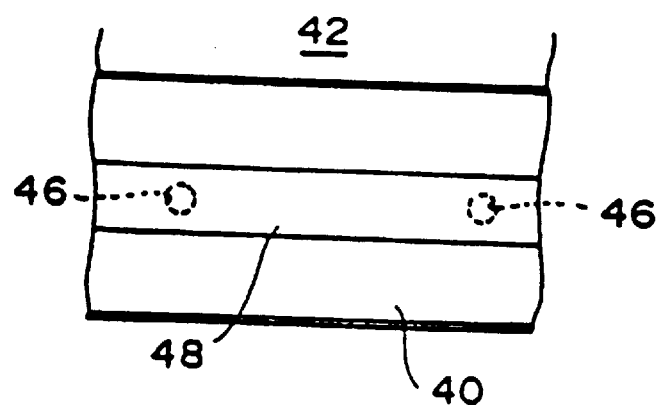
FIG. 6 is a partial plan view of a carrier plate.

The front side of the carrier plate 140 (the side opposite to that illustrated in FIG. 7) is provided with projection 143 (not illustrated in FIG. 7), projecting from the split face, the projection being in a shape which is brought into contact with the upper end of the bearings 132 corresponding to the width and thickness of the above notched slot 119 (see FIGS. 3 and 4 of the previous example). The front and back sides of the carrier plate 140 are provided with annular grooves 144 and 145 (not illustrated in FIG. 7) in a shape of surrounding each of the openings 141 and 142 corresponding to the openings 116 and 117 of the above first and second parts. This is so except for the fact that the annular groove 144 on the surface side surrounding the openings 141 is made discontinuous by projection 143 (see FIG. 3). Annular grooves 144 and 145 on the front side are made to be connected through their bottoms to the annular grooves 144 and 145 for the back side, respectively, through a connecting opening 146 (not illustrated in FIG. 7) provided at the designated intervals. Rubber, and the like, gaskets 147 and 148 are provided by casting to the annular grooves 144 and 145 of both the front and back sides, so as to project from the front and back sides, respectively, in a noncompressed state. Incidentally, the gaskets 147 and 148 for both the front and back faces are connected through the above connecting openings 146 so as to prevent them from dropping off from the carrier plate 140 after casting.

However, in this example, air intake manifold proper 110, supplementary air intake manifold 120, and a carrier plate 140 are first molded from a resin into the above configuration. This is followed by assembling with a sub-assembled air intake control valve 131. Shaft 130 is placed in groove 118 with the bearings 132 being engaged with notched grooves 119, and the carrier plate 140 is attached to flange 112. The flange 121 of the supplementary air intake manifold 120 is then attached to the carrier plate 140. Flanges 112 and 121 are fastened by bolts which are not illustrated, while carrier plate 140 is interposed therebetween. As the fastening progresses, as in the previous example, gaskets 147 and 148 of the carrier plate 140 are compressed and deformed to bring the split faces to come into contact with each other. Incidentally, in this case projection 143 which projects from the surface side split face of carrier plate 140 fits in the top of notched grooves 119 to come in contact with the edge flat face of bearing 132, thereby aligning bearing 132 to the designated positions to secure the bearings 132. An actuator which is not illustrated is connected to the shaft 130.

In a lean combustion system in this example, for example in a low to middle load region of an engine, the shaft 130 is driven by the actuator to cause it to rotate, while sliding against bearings 132, when intake control valve 131 supported on shaft 130 closes the first air intake passage 113 to cause the air intake through the engine to pass only via the second air intake passage 114. The second air passage 114 is connected to a floor port of the engine via the second supplementary air intake passage, so that the mixed gas assumes a swirl, which is optimum for lean combustion in a combustion chamber. As the system reaches a high load region, the first air inlet passage 113 is opened by the air inlet control valves 131, so as to permit air intake through both the first and second air intake passages 113 and 114. This results in a reduced air intake resistance to assure the high output.

When the air intake control valves 113 are closed, any leakage between each air intake passage 113 and 114 is prevented because the U-shaped bearings 132 are engaged with notched grooves 119 near the shaft 130 and the edge sections thereof are brought into contact with the positions 143 of the carrier plate 140, as well as by gaskets 147 and 148 (not illustrated in FIG. 7) between the split faces.

The second example shows an example using a supplementary air intake manifold 120 to be attached to the cylinder head, but the supplementary air intake manifold 120 is not always needed depending upon engine types. For example, without having a supplementary air intake manifold 120, air intake manifold proper 110 may be attached to the cylinder head via a carrier plate 140. In this case, the air intake manifold proper 110 makes up the first part of the air intake constituting part, and the carrier plate 140 makes up the second part.

Figure 8:
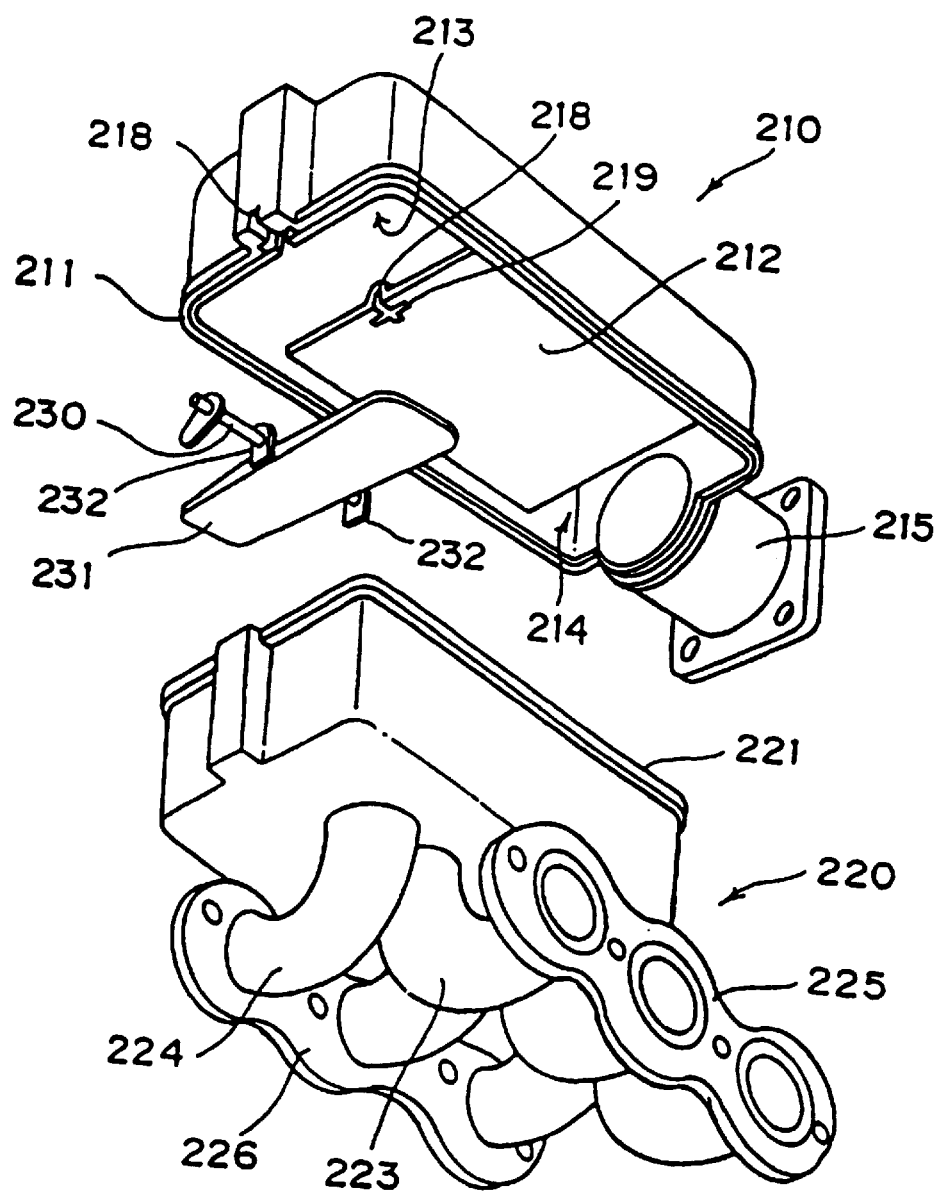
FIG. 8 is an exploded oblique view showing Example 3 of this invention.

The third example of this invention is described by referring to FIG. 8.

The third example is an application of this invention to a variable air intake system which makes use of an air resonance action.

In the figure, 210 is the top side air inlet manifold and 220 is the bottom side air inlet manifold and both in their entirety are molded as in the previous examples of a glass fiber-reinforced thermoplastic resin. The top air intake manifold 210 has a half-split box shape with its bottom periphery being provided with a joining flange 211. Furthermore, in this example, a barrier wall 212 which separates the half split box between the top and bottom is mounted in the center at a location about the same height as that of the joining flange 211 and the rest of the section is opened as openings 213 and 214 for the first and second parts.

The bottom air intake manifold 220 also has a half split box shape, having on the top end a joining flange 221. Air inlet passages 223 and 224 corresponding to each cylinder of an engine (not illustrated) extend from the bottom of the half split box shape; these air intake passages open as openings of the first and second attaching flanges 225 and 226. This example is for an air intake manifold for a V-type six cylinder engine, so that the first and second attaching flanges 225 and 226 are arrayed right and left in parallel.

In molding the top air intake manifold 210, a joining flange 211 and the edged face of barrier wall 212, that is the split face, are provided with a cross-sectional U-shaped groove 218 in a direction perpendicular to the axis of the first opening 213. The groove 218 has one end opened to the outside at the joining flange 211 so as to allow the shaft to be described later to be extended outwardly. Groove 218 is provided with at least one notched slot 219 on both sides of the opening 213. Notched slot 219, as in the case of the previous examples, is a designated broader and deeper U-shaped slot compared to the cross-sectional U-shaped groove 218, and has the designated thickness.

For the top air intake manifold 210, duct 215 having an axis perpendicular to the axis of the second opening 214 is integrally molded with its axis matching that of joining flange 211. The duct 215 is connected to an upstream throttle body (not illustrated).

Here, the aforementioned top air intake manifold 210 makes up the first part of the air intake constituting part and the bottom air intake manifold makes up the second part of the air intake constituting part and the edge surfaces of the joining flanges 211 and 221 and barrier wall 212 make split faces.

230 is a shaft having its axis in a direction perpendicular to that of the opening 213. To said shaft 230 is attached by mold shaping a rectangular resin air intake control valve 231 conforming to the shape of opening 213. Shaft 230 is provided with bearings 232 which slidably support the shaft 230 at the positions corresponding to the above notched grooves 219. The bearings 232, as in the previous examples, have a width and thickness enough to be engaged with notched grooves 219 to make up a labyrinth seal with the edge of the bearing being made to a flat U-shape. It is made of a resin or metal with excellent sliding properties, preferably of polyimide or polyamide in the case of the resin and a bearing metal in the case of a metal.

This example does not use the carrier plate used in the previously examples. The joining flange 221 of the bottom air intake manifold 220 is provided with a projection (not shown in FIG. 8) projecting from the split face, with the projection being in a shape which is brought into contact with the top edge of the bearings 232 corresponding to the width and thickness of the above-mentioned notched grooves 19. Either joining flange 211 or 221 is provided with a groove, which groove is provided with a rubber, or the like, gasket similar to that of the previous example.

However, in this example, after the top air intake manifold 210 and bottom air intake manifold 220 have been molded with the resin in the above configuration, they are assembled together with an assembly of the shaft 230 and air intake control valve 231. The shaft 231 is held in groove 218 while the bearings 232 are engaged with the notched grooves 219 of the top air intake manifold 210 and then the bottom air intake manifold 220 is mounted. In this case, the projection which projects from the split face of the bottom air intake manifold engages with the edge of the notched grooves 219 to come into contact with the flat end faces of bearings 232, thereby aligning to secure the bearings 232 at the designated positions. An actuator which is not illustrated and the shaft 230 are connected to each other.

Thus, as the top and bottom side air intake manifolds 210 and 220 are joined together, a first surge chamber is formed on the bottom side of the barrier wall 212 and the second surge chamber on the top of the barrier wall 212.

In the variable air intake system of this example, air intake control valve 231 is closed, for example, in an engine at a low-to-medium revolution region, thereby introducing an air intake to the engine via the first surge chamber of a small capacity. In an engine high revolution region, the first opening 213 is opened by the air intake control valve 231 driven by the actuator and supported by the shaft 230, wherein the second surge chamber absorbs any pulsation of the air intake. Therefore, the essential lengths or capacities of the air intake system that affect the pulsating air intake are optimally switched according to the engine revolution region, thereby achieving improved torque over the entire revolution region.

Figure 9:
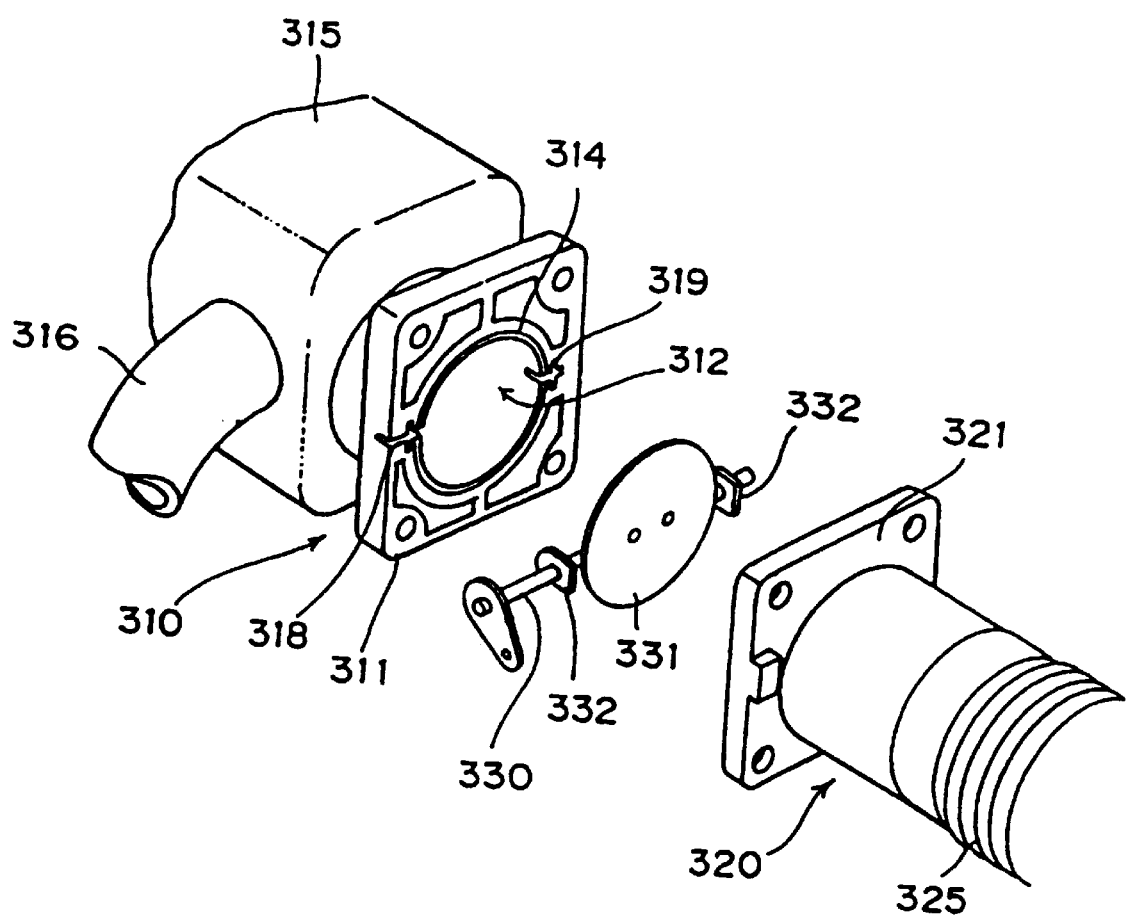
FIG. 9 is an exploded oblique view showing Example 4 of this invention.

The fourth example of this invention is explained by referring to FIG. 9.

The fourth example is an application of this invention to the throttle body of an air intake system.

In FIG. 9, 310 is a first throttle body and 320 is a second throttle body, both are molded as in the previous examples of a glass fiber reinforced thermoplastic resin. In this example, the first throttle body 310 is integrally molded with surge tank 315 and the second throttle body with air duct 325, connected to an air cleaner. The first and second throttle bodies 310 and 320 are half split cylinders and have openings 312 and 322 (322 is not illustrated in the figure) along with air intake passages and edges of the openings provided with joining flanges 311 and 321. An air intake passage 316 corresponding to each cylinder of an engine (not illustrated) is mounted to extend from the surge tank 315.

In molding the first throttle body 310, the edge face of the joining flange 311, that is the split face is provided with a cross-sectional U-shaped groove 318 in a direction perpendicular to the axis of the opening 312. The groove 318 has one end opened to the outside at joining flange 311 in order to allow the shaft (to be described) to extend outwardly. The groove 318 is provided with at least one notched slot 319 at each side of opening 312. Notched slots 319, as with the previous examples, have designated broader and deeper U-shaped grooves compared to the cross sectional U-shaped groove 318 and have the designated thickness.

Here, the aforementioned first throttle body 310 makes up the first part of the air intake constituting part and second throttle body 310 makes up the second part of the air intake constituting part where the edge faces of the joining flanges 311 and 321 are split faces.

330 is a shaft having an axis in a direction perpendicular to the axis of opening 312. Said shaft 230 has a hinged butterfly type throttle valve 331 as an intake control valve. The shaft 330 is provided with bearings 332 which support slidably the shaft 330 at positions corresponding to the above notched grooves 319. The bearings 332 as in the previous examples, have a width and thickness to engage with the notched grooves 319 to constitute a labyrinth seal with the edge shaped into a flat U-shape. It is made of a resin with excellent sliding properties or a metal, preferably of polyimide or polyamide in the case of a resin and a bearing metal in the case of a metal.

In this example also, no carrier plate of Examples 1 or 2 is used; the joining flange 321 is provided with a projection (not illustrated in FIG. 9) projecting from a split face, the position corresponding to the width and thickness of the aforementioned notch grooves 319 and being brought into contact with the upper end of the bearings 332. Joining flange 311 is provided with a groove in a shape to surround opening 312 and said groove, as in the previous examples, is provided with a rubber or like gasket 314.

In this example, after the first throttle body 310 and second throttle body 320 have been molded from a resin into the above configuration, they are assembled with an assembly of shaft 330 and throttle body 331, that is, shaft 330 is held in groove 318 while the bearings 322 are engaged with notched grooves 319 of the throttle body 310 and the second throttle body 320 is attached. In this case, the projection projecting from the second throttle body 320 split face is engaged in the edge of the notched grooves 319 and is brought into contact with the edge flat face of bearings 332, SO as to align and secure the bearings 332 at the designated positions. A throttle linkage which is not illustrated is linked to the shaft 330.

The throttle body is completed as the first and second throttle bodies 310 and 320 are joined together.

Advantageous Effect of the Invention

As described above, according to one embodiment of this invention, the air intake constituting part with its air passage through an engine compartment being formed open is molded from at least a first and a second resin part which has a split face between the two and the split face of the first part is provided with a groove in a direction perpendicular to the axis of the opening; a bearing which slidably supports a shaft provided with an intake control valve is made to fit into the groove and the projection which projects from the split face of the second part is brought into contact with the bearing; the shaft is held within the groove provided on the split face of the first part, so that the mold structure is simplified and axis center precision can also be maintained. Therefore, this makes it easy to fabricate an air intake system provided with an intake control valve from the resin. Furthermore, the bearing part is made to fit in the slot and the projection is brought into contact with the bearing, so as to readily assure the sealability of the shaft support.

According to a preferred embodiment of this invention, said groove has a U-shaped cross section and is provided with a notched slot within which the side edges of said bearing fit, so that there is no revolution of the bearing due to the revolution of the shaft or shifting in the thrust direction to further give better sealability.

According to a further improved embodiment, said first and second parts make up an air intake manifold provided with a plurality of air intake passages fabricated in parallel and the shaft is a common shaft that supports the air intake control valves corresponding to the plurality of air passages and at least one of said bearings is mounted on each side of each air intake passage; hence, the mold structure as described above can be simplified and its axis center precision can also be maintained. Furthermore, the sealability of the shaft support, that is, the sealability between each air intake passage can also be readily assured.

According to another preferred embodiment of this invention in which the above first and second parts make up a throttle body and said air intake control valve is a throttle valve, there is no need to mold the groove body independently, thereby simplifying the mold structure.

According to another embodiment of this invention, the air intake constituting part with its air intake passage through an engine compartment chamber is fabricated open and is molded from at least a first, second, and third part having a split face therebetween and the split face of the first part is provided with a groove in a direction perpendicular to the axis of the opening; a bearing which supports slidably a shaft provided with an air intake control valve is made to fit into the above groove; a projection which projects from the front side split face of the third part is brought into contact with the bearing, at the same time bringing the backside split face into contact with the split face of the second part; thus, the shaft can be held in the groove provided on the split face of the first part, so that the mold structure can be simplified and the bearing center precision can also be maintained. Furthermore, since the bearing is made to fit into the slot and the projection which projects from the front side split face of the third part is brought into contact with the bearing, the sealability of the shaft support can also be readily assured.

Furthermore, according to a preferred embodiment, the third part is a plate provided with a gasket for sealing in the form of surrounding the air intake passages for both the front side split face and back side split face so that the sealability between each air intake passage can also be assured, in addition, making it easy to fabricate the third part. The mold structure can also be further simplified.

What is claimed is:

1. An air intake system comprising an air intake manifold (20) having inlet (23) and outlet (15) passages and a control valve (31) supported by a shaft (30), characterized in that said manifold (20) has a split face comprised of at least a first and a second molded part, said first part being provided with a groove (18) therein for receiving a bearing (32) for slidably supporting said shaft (30) and for receiving a projection (43) on said second part for retaining said bearing (32) and aligning said first and second parts.

2. An air intake system as set forth in claim 1 wherein said first part is provided with a U-shaped groove (18) having a notch (19) therein for receiving said bearing (32).

3. An air intake system as set forth in claims 1 or 2 wherein said first and second parts comprise an intake manifold (110) provided with a plurality of air intake passages (113, 114) built in parallel; said shaft (130) is a common shaft which supports control valves (131) corresponding to the plurality of air intake passages (113, 114); and said bearings (132) are mounted with at least one on each side of each air intake passage.

4. An air intake system as set forth in claims 1 or 2 wherein said first and second parts (310, 320) make up a throttle body and said intake control valve (331) is a throttle valve.

* * * * *